United States Patent Office 3,069,466
Patented Dec. 18, 1962

3,069,466
NEW N₁-HALOGENOALKYL-PHENYL-SULFONYL-N₂-SUBSTITUTED UREAS, AND THE CORRESPONDING CYCLOHEXYL COMPOUNDS
Martin Pantlitschko, Vienna, Austria, assignor to Anton von Waldheim, Chem.-Pharm. Fabrik, Vienna, Austria
No Drawing. Filed Apr. 21, 1959, Ser. No. 807,949
4 Claims. (Cl. 260—553)

The preparation of aryl sulfonyl ureas and compounds substituted in both N-atoms is described in numerous publications and patents, since these compounds have a very high bacteriostatic effect. The blood sugar lowering action of sulfonyl ureas has become known only in recent times.

The preparation of various sulfonyl ureas is described in U.S. Patent No. 2,390,253, French Patent No. 993,405 and Austrian Patents Nos. 195,436 and 196,413.

Some of the compounds mentioned in the above patents have a chemotherapeutic action which is undesirable for long term use as an oral remedy, for diabetes and some have a blood sugar lowering activity inferior to that of the products according to the present methods as regards the duration of the action.

Subject of the present invention is the production of new sulfonyl ureas and their salts of the general formula

R—SO₂—NH—CO—NH—R in which R signifies an alkyl-, cycloalkyl-, or alkylcycloalkyl group which may be substituted one or more times by halogene or rhodanide, or a phenyl group substituted by an alkyl. At least one of the substituents being required to be substituted, by halogene or rhodanide and the group R being required to have 3–8 C-atoms. The essential feature is that a urea group of the general formula

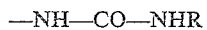

—NH—CO—NHR is introduced into compounds containing the general group RSO₂—; this if necessary in a plurality of steps.

The starting materials employed are compounds unknown in literature.

The manufacturing process used are processes generally known for producing other sulfonyl ureas. A number of general examples will be mentioned here:

(1) For example chloro butane sulfonamid can be reacted with butylisocyanate, or with another primary halogen- or rhodanide-substituted alkyl-, cycloalkyl-, alkylcycloalkyl- or an alkylphenylisocyanate.

Using the reverse reaction sequence it is also possible to react alkyl-, cycloalkyl-, alkylcycloalkyl, or alkylphenylsulfonyl isocyanates with butylamine or substituted primary amines.

(2) Another method of production consist in that urethanes (ester of carbamicacid) are employed instead of isocyanates halogen- or rhodanide substituted alkyl-, cycloalkyl-, alkylcycloalkyl-, or alkylphenyl sulfonylurethanes being reacted for example with primary amines. The reverse process, that is reacting halogene-, alkyl-, cycloalkyl-, alkylcycloalkyl-, alkylphenylurethanes with the corresponding sulfonamide also results in the desired product. Instead of ureas it is also possible to start from corresponding mono-substituted ureas and react them with primary amines.

(3) A further method of synthesizing the desired compounds consists in that the thioureas are first prepared desulfurized and the desired product made therefrom.

The reaction conditions of the methods mentioned above may be varied widely. The solvents as well as the reaction temperature have a decisive influence on the yield. A specially simple method is the reaction of halogen-, or rhodanide-, alkyl-, cycloalkyl-, alkylcycloalkyl- or alkylphenyl sulfonamides in the form of their salts, with the corresponding isocyanates which process provides very good yields.

The compounds, which can be obtained by the methods mentioned above, are crystallized, substances of great stability which are of physiological importance. They have a strong blood sugar lowering action of long duration and exhibit an extremely low toxicity. The essential point is that none of the compounds has a bacterio-static effect, which occurs in the sulfonyl ureas as an unpleasant attendant phenomenon in oral therapy of diabetes. The determination of the blood sugar lowering action was carried out on various test animals—rats, dogs and rabbits, by oral administration of the substance or by i.v. application of the sodium salt of the compound. As an example there may be mentioned the effect of 50 mg. N₁-4-chlorobutylsulfonyl-N₂-butylurea which was administered intravenously in the form of its sodium salt. The blood sugar of a healthy hungry rabbit fell from 102 mg. percent to 52 mg. percent within 10 minutes and remained at this value for about 12–16 hours. In healthy test-individuals who had not yet breakfasted the lowering of the blood sugar with a dose of 0.5 g. was about 25–30 mg. percent. With administration of long duration (0.5 g. over a period of 4 weeks) no damage or change of liver, kidney or milt could be noted on test animals. The granulation of β-cells of pancreas was absolutely normal.

Examples for the Invention Methods (1) N₁ - 4 - chlorbutylsulfonyl-N₂-butylurea: 171 g. 4-chlorbutanolsulfonamide are covered by pouring 130 cc. acetone thereover. 40 g. of a 10% aqueous solution of NaOH are added. 99 g. n-butylisocyanate are so added dropwise at 10° C. while stirring briskly that no substantial heating of the reaction material can occur. After having added the whole butylisocyanate, stirring is continued until the smell of isocyanate has disappeared. The mixture is diluted with water, the liquid filtered from the precipitated symmetrical butylurea, the filtrate carefully acidified and filtration carried out from the precipitate after cooling. For further purification the precipitate is absorbed in diluted lyes (NH₃), boiled with charcoal, and the N₁-4-chlorobutyl sulfonyl N₂-butyl urea is again precipitated by careful acidification. The crystals obtained are re-crystallized from dilute ethylalcohol. (Fp: 86–88° C.). Yield: 83%.

Similarly, when 1-chlorobutylisocyanate is used N₁-4-chlorbutylsulfonyl-N₂-4-chlorbutylurea (Fp: 72–73° C.) is obtained. Yield: 63%.

(2) N₁-chlorbutylsulfonyl-N₂-propylurea: 120 g. chlorobutyl sulfonylcarbamic-acid ethyl ester (prepared from the corresponding sulfonamide and chlorformic acid ester) are dissolved in 100 cc. of dioxane and 35 g. propylamine are allowed to drop into the mixture and the mixture is boiled while refluxing. The solvent is distilled off and the residue is treated with water. Further purification is carried out in conventional manner. (Fp: 82–83% C.) Yield: 87%.

(3) N₁-cyclohexansulfonyl-N₂-4′-chlorbutylurea: To a solution of 100 g. chlorhexansulfonisocyanate (bp.: 78–81° C./0.05 mm.) in 150 cc. absolutic benzene there are slowly added dropwise 55 g. 1-chlor-4-aminobutan. Boiling is then carried out for 2 hours under reflux, and the benzene is distilled off. For purification the residue is treated with dilute NH₄OH, the solution is filtered, with charcoal, allowed to cool and brought to a pH of 3–4 with acetic acid. The obtained N₁-cyclohexansulfonyl-N₂-4′-chlorbutylurea is recrystallized from ethylacetate. Fp: 118–120° C. Yield: 86%.

(4) N₁ - p - chlormethylphenylsulfonyl - N₂ - propylurea: 110 g. chlormethylbenzenesulfonamide are dissolved in 300 cc. of acetone, and 250 cc. 2n NaOH are added thereto while stirring briskly. While cooling 40 g. propylisocyanate are added dropwise thereto, and the mixture is stirred until smell of isocyanate has disappeared. Filtration from any symmetrical urea formed is carried out and the clear filtrate is acidified with acetic acid, cooled and filtered. The precepitate is further purified in the conventional manner. Recrystallisation is carried out from ethyl acetate. Fp: 143–144° C.

(5) N₁ - chlormethylcyclohexylsulfonyl - N₂ - butylurea: 19.7 g. chlormethylcyclohexylsulfonamide are dissolved in 20 cc. dry aceton and 12 grams of dry potassiumcarbonate are added thereto. While stirring briskly the mixture is boiled for 2 hours under reflux cooled and 10 g. butylisocyanate are added dropwise. Stirring is carried out until the smell of isocyanate has disappeared. The mixture is diluted with water, the liquid filtered off from any symmetric urea formed clarified with charcoal and the solution is brought to a pH 3–4 with acetic acid. The precipitate is filtered and recrystallized from ethylalcohol. Fp: 118–119° C. Yield: 72%.

Similarly, when rhodanide substituated starting materials are employed the new sulfonureas according to the invention are obtained.

I claim:
1. Sulfonyl ureas of the formula

X—CH₂—Z—SO₂—NH—CO—NH-lower alkylene-Y wherein X is a member selected from the class consisting of chloro and isocyanate, Z is a member of the group consisting of phenylene and cyclohexylene, and Y is a member selected from the class consisting of hydrogen, chloro and isocyanate.

2. A sulfonyl urea of the formula chloro-CH₂-phenylene-SO₂—NH—CO—NH-lower alkyl.

3. A sulfonyl urea of the formula

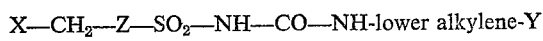

4. A sulfonyl urea of the formula
chloro - CH₂ - cyclohexylene-SO₂—NH—CO—NH-lower alkyl.

References Cited in the file of this patent
UNITED STATES PATENTS

| | | |
|---|---|---|
| 2,385,571 | Haack | Sept. 25, 1945 |

FOREIGN PATENTS

| | | |
|---|---|---|
| 196,413 | Austria | Mar. 25, 1958 |
| 204,563 | Austria | July 25, 1959 |
| 604,259 | Great Britain | June 30, 1948 |
| 496,949 | Belgium | Nov. 3, 1950 |
| 993,465 | France | July 25, 1951 |

OTHER REFERENCES

Kurzer: Chem. Reviews, vol. 50, pages 1–19; 27 (1952).
Cassady et al.: J. Org. Chem., vol. 23 pages 923–926 (June, 1958).
Marshall et al.: J. Org. Chem., vol. 23, pages 927–929 (June, 1958).